US012609130B2

(12) United States Patent
Zhang et al.

(10) Patent No.: US 12,609,130 B2
(45) Date of Patent: Apr. 21, 2026

(54) METHOD FOR ADJUSTING AUDIO FREQUENCY AND AUDIO FREQUENCY ADJUSTMENT DEVICE

(71) Applicant: Realtek Semiconductor Corporation, Hsinchu (TW)

(72) Inventors: Liang Zhang, Jiangsu Province (CN); Xiao-Guo Zheng, Jiangsu Province (CN)

(73) Assignee: Realtek Semiconductor Corporation, Hsinchu (TW)

( * ) Notice: Subject to any disclaimer, the term of this patent is extended or adjusted under 35 U.S.C. 154(b) by 518 days.

(21) Appl. No.: 18/056,706

(22) Filed: Nov. 17, 2022

(65) Prior Publication Data

US 2023/0260532 A1 Aug. 17, 2023

(30) Foreign Application Priority Data

Feb. 11, 2022 (CN) ......................... 202210127129.3

(51) Int. Cl.
*G10L 21/0324* (2013.01)

(52) U.S. Cl.
CPC ................................ *G10L 21/0324* (2013.01)

(58) Field of Classification Search
CPC ..... G10L 21/0324; G10L 19/26; G10L 25/48; H03L 7/183; H03G 9/18; H03G 9/24; H04L 7/005
See application file for complete search history.

(56) References Cited

U.S. PATENT DOCUMENTS 7,154,419 B2 * 12/2006 Mukai ..................... G10L 25/48 375/372
7,646,836 B1 * 1/2010 Mays .................. H04L 12/6418 375/372
7,760,766 B2 * 7/2010 Takahashi ................. H04S 7/00 375/376

(Continued)

FOREIGN PATENT DOCUMENTS

CN 102100021 A 6/2011
JP 2017003654 A * 1/2017 ........... G10L 21/034
TW I386002 B 2/2013

*Primary Examiner* — Paras D Shah
*Assistant Examiner* — Nadira Sultana
(74) *Attorney, Agent, or Firm* — CKC & Partners Co., LLC

(57) ABSTRACT

A method for adjusting audio frequency includes steps of: obtaining initial frequency and temporary data storage of audio data input to a buffering unit; performing a first adjustment procedure on initial frequency to obtain a first variation of temporary data storage corresponding to a first change of initial frequency; calculating a first frequency correction amount according to first variation and a first period of first adjustment procedure; adjusting initial frequency into first frequency according to first frequency correction amount; inputting first frequency into buffering unit; performing a second adjustment procedure on first frequency to obtain a second variation of temporary data storage corresponding to a second change of first frequency; calculating a second frequency correction amount according to second variation and a second period of second adjustment procedure, which first period is less than second period; and adjusting first frequency into target frequency according to second frequency correction amount.

16 Claims, 4 Drawing Sheets

100

(56) References Cited

U.S. PATENT DOCUMENTS

| | | | | |
|---|---|---|---|---|
| 8,135,105 | B2 * | 3/2012 | Liu | H03L 7/183<br>375/376 |
| 8,258,846 | B2 * | 9/2012 | Lin | H04L 7/005<br>327/299 |
| 10,199,047 | B1 * | 2/2019 | Clark | H03G 9/24 |
| 11,950,064 | B2 * | 4/2024 | Granger | H03G 9/18 |
| 2011/0043694 | A1 * | 2/2011 | Izuno | H04N 21/4392<br>348/E9.034 |
| 2015/0363411 | A1 * | 12/2015 | Du | G06F 3/165<br>700/94 |
| 2020/0059504 | A1 * | 2/2020 | Ho | H04L 65/80 |
| 2021/0249024 | A1 * | 8/2021 | Liu | G10L 19/26 |
| 2022/0212108 | A1 * | 7/2022 | Zheng | G06F 3/165 |
| 2024/0078201 | A1 * | 3/2024 | Wei | G06F 11/14 |

* cited by examiner

METHOD FOR ADJUSTING AUDIO FREQUENCY AND AUDIO FREQUENCY ADJUSTMENT DEVICE

RELATED APPLICATIONS

This application claims priority to China Application Serial Number 202210127129.3, filed on Feb. 11, 2022, which is herein incorporated by reference in its entirety.

BACKGROUND

Field of Invention

The present disclosure relates to an electronic device and a method. More particularly, the present disclosure relates to a method for adjusting audio frequency and an audio frequency adjustment device.

Description of Related Art

In conventional technology, methods for adjusting audio frequency are mainly divided into two methods: a method for audio tracking to adjust an audio frequency and a method for audio sampling frequency to calculate an audio frequency.

First, the first method is that an audio frequency is adjusted for audio tracking. The first method mainly adjusts audio frequency according to set value of an audio frequency and related audio frequency parameters. An adjustment time and a magnitude of the audio frequency adjustment cannot be precisely controlled.

In addition, the second method is that an audio frequency is calculated for audio sampling frequency. The second method mainly calculates an audio frequency according to two parameters of audio data packet. Two parameters are Maud (M value for Audio) and Naud (N value for Audio). The second method relies on an accuracy of both parameters. If there is an error between two parameters, an adjusted audio frequency will be different from an actual frequency.

For the foregoing reason, there is a need to provide other suitable designs for a method for adjusting audio frequency to solve the problems of the prior art.

SUMMARY

One aspect of the present disclosure provides a method for adjusting an audio frequency. The method for adjusting the audio frequency includes following steps: obtaining an initial frequency and a temporary data storage of a piece of audio data input to a buffering unit; performing a first adjustment procedure on the initial frequency; The first adjustment procedure includes following steps: obtaining a first variation of the temporary data storage corresponding to a first change of the initial frequency; calculating a first frequency correction amount according to a first period of the first adjustment procedure and the first variation; and adjusting the initial frequency into a first frequency according to the first frequency correction amount. Inputting the first frequency into the buffering unit; and performing a second adjustment procedure on the first frequency; The first adjustment procedure includes following steps: obtaining a second variation of the temporary data storage corresponding to a second change of the first frequency; calculating a second frequency correction amount according to a second period of the second adjustment procedure and the second variation, which the first period of the first adjustment procedure is less than the second period of the second adjustment procedure; and adjusting the first frequency into a target frequency according to the second frequency correction amount.

Another aspect of the present disclosure provides an audio frequency adjustment device. The audio frequency adjustment device includes a buffering unit and a frequency feedback circuit. The buffering unit is configured to receive a piece of audio data. The frequency feedback circuit is coupled to the buffering unit. The frequency feedback circuit is configured to obtain an initial frequency and a temporary data storage of a piece of audio data input to the buffering unit. The frequency feedback circuit is configured to perform a first adjustment procedure on the initial frequency. The first adjustment procedure includes following steps: obtaining a first variation of the temporary data storage corresponding to a first change of the initial frequency; calculating a first frequency correction amount according to a first period of the first adjustment procedure and the first variation; and adjusting the initial frequency into a first frequency according to the first frequency correction amount. The frequency feedback circuit is configured to input the first frequency to the buffering unit. The frequency feedback circuit is configured to perform a second adjustment procedure on the first frequency. The second adjustment procedure includes following steps: obtaining a second variation of the temporary data storage corresponding to a second change of the first frequency; calculating a second frequency correction amount according to a second period of the second adjustment procedure and the second variation, the first period of the first adjustment procedure is less than the second period of the second adjustment procedure; and adjusting the first frequency into a target frequency according to the second frequency correction amount.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
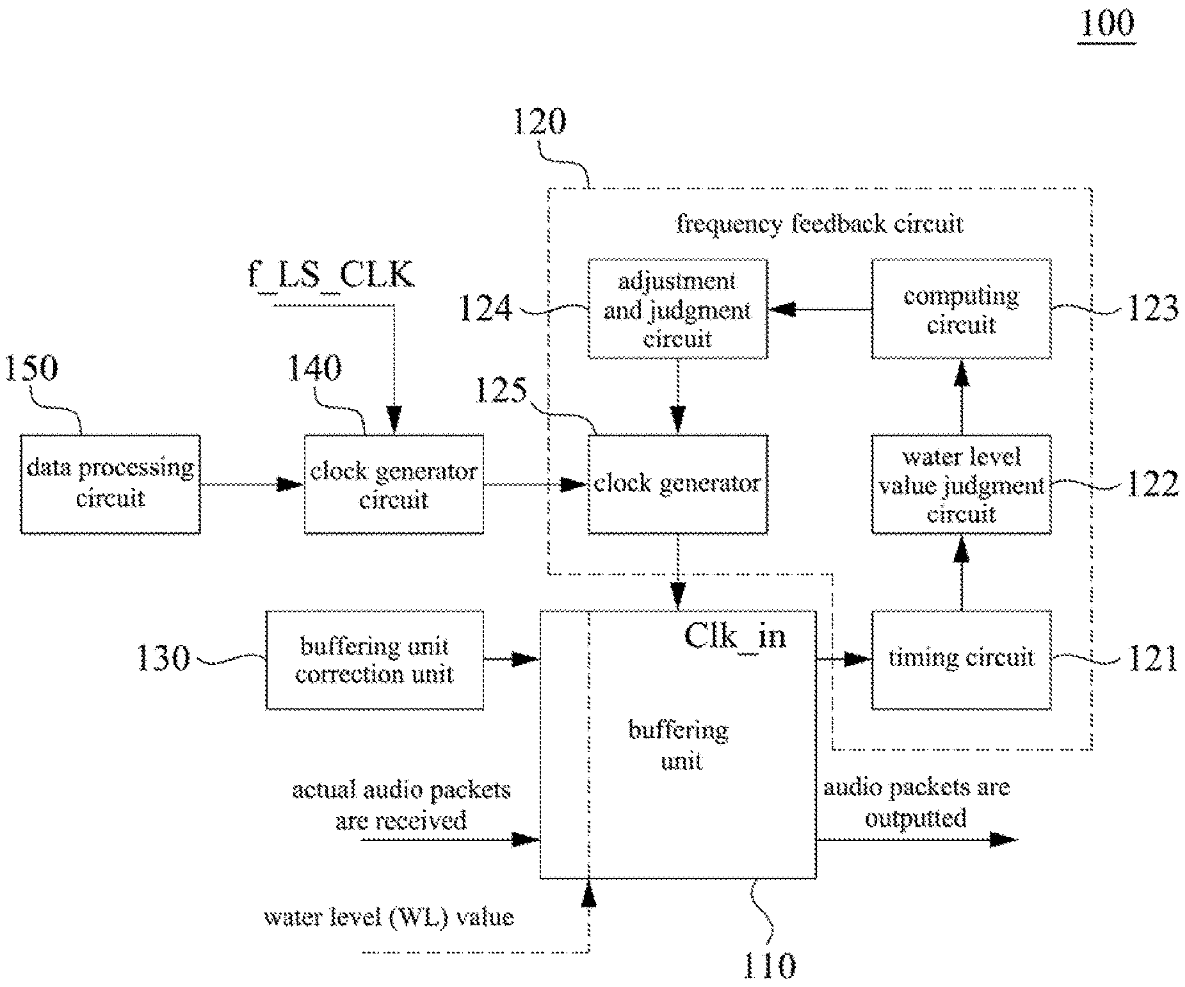
FIG. 1 depicts a schematic diagram of an audio frequency adjustment device according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise.

Furthermore, it should be understood that the terms, "comprising", "including", "having", "containing", "involving" and the like, used herein are open-ended, that is, including but not limited to.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

FIG. 1 depicts a schematic diagram of an audio frequency adjustment device 100 according to some embodiments of the present disclosure. In some embodiments, the audio frequency adjustment device 100 includes a buffering unit 110 and a frequency feedback circuit 120. The buffering unit 110 is configured to receive a piece of audio data. The frequency feedback circuit 120 is coupled to the buffering unit 110. The frequency feedback circuit 120 is configured to obtain an initial frequency and a temporary data storage of a piece of audio data input to the buffering unit 110.

The frequency feedback circuit 120 is configured to perform a first adjustment procedure on the initial frequency. The first adjustment procedure includes following steps: a first variation of the temporary data storage corresponding to a first change of the initial frequency is obtained. A first frequency correction amount is calculated according to a first period of the first adjustment procedure and the first variation. The initial frequency is adjusted into a first frequency according to the first frequency correction amount.

The frequency feedback circuit 120 is configured to input the first frequency to the buffering unit 110. The buffering unit 100 is configured to receive a piece of audio data according to the first frequency so as to generate new temporary data storage. The frequency feedback circuit 120 is configured to perform a second adjustment procedure on the first frequency. The second adjustment procedure includes following steps: a second variation of the temporary data storage corresponding to a change of the first frequency is obtained. A second frequency correction amount is calculated according to a second period of the second adjustment procedure and the second variation. The first period of the first adjustment procedure is less than the second period of the second adjustment procedure. The first frequency is adjusted into a target frequency according to the second frequency correction amount.

In some embodiments, the buffering unit 110 includes a First In First Out (FIFO) memory. The buffering unit 110 includes a data capacity. The buffering unit 110 is configured to receive actual audio packets and output audio packets. It should be noted that the data capacity refers to how many N-bit data the buffering unit 110 can store. For example: an 8-bit buffering unit 110, if the data capacity is 8, it means that the buffering unit 110 can store eight 8-bit data. If the data capacity is 12, it means that the buffering unit 110 can store twelve 8-bit data. A data capacity and bit values of the buffering unit 110 can be designed according to actual needs, and is not limited to the embodiments of present disclosure.

In some embodiments, the frequency feedback circuit 120 includes a timing circuit 121, a water level value judgment circuit 122, a computing circuit 123, an adjustment and judgment circuit 124, and a clock generator 125. The timing circuit 121 and the clock generator 125 are coupled to the buffering unit 110. The timing circuit 121 is coupled to the water level value judgment circuit 122. The water level value judgment circuit 122 is coupled to the computing circuit 123. The computing circuit 123 is coupled to the adjustment and judgment circuit 124. The adjustment and judgment circuit 124 is coupled to the clock generator 125.

In some embodiments, the timing circuit 121 is configured to set a minimum adjustment time of an adjustment time length of an audio frequency.

In some embodiments, the water level value judgment circuit 122 is configured to detect a raising and falling status of a water level (WL) value in the buffering unit 110. It should be noted that a water level (WL) value in the buffering unit 110 will raise and fall during an adjustment procedure of the audio frequency. A piece of audio data is stored in the buffering unit 110. If the buffering unit changes a unit of water level (WL) value within one second, it means that the piece of audio data should be adjusted by 1 (Hz).

In some embodiments, the computing circuit 123 is configured to calculate a frequency correction amount of the audio frequency which is adjusted through the first adjustment procedure, or calculate a frequency correction amount of the audio frequency which is adjusted through the second adjustment procedure.

In some embodiments, the adjustment and judgment circuit 124 is configured to determine whether the audio frequency is in the first adjustment procedure or in the second adjustment procedure. It should be noted that a difference between the first adjustment procedure and the second adjustment procedure is the different adjustment time lengths. The first adjustment procedure is corresponding to the first period. The second adjustment procedure is corresponding to the second period. A first adjustment time length of the first period of the first adjustment procedure is less than a second adjustment time length of the second period of the second adjustment procedure. In some embodiments, the first adjustment procedure is a coarse tuning procedure. The second adjustment procedure is a fine tuning procedure. In some embodiments, the first adjustment time length can be about 80 milliseconds (ms). The second adjustment time length can be about 1000 milliseconds (ms).

In some embodiments, the audio frequency adjustment device 100 further includes a buffering unit correction circuit 130, a clock generator circuit 140, and a data processing circuit 150. The buffering unit correction circuit 130 is coupled to the buffering unit 110. The clock generator circuit 140 is coupled to the frequency feedback circuit 120. The data processing circuit 150 is coupled to the clock generator circuit 140. In some embodiments, the clock generator 125 is configured to generate an audio clock signal Clk_in so as to input into the buffering unit 110. The buffering unit 110 is configured to generate an audio sampling frequency according to the audio clock signal Clk_in and store a piece of audio data corresponding to the audio sampling frequency into the buffering unit 110 to wait for outputting. The audio clock signal Clk_in corresponds to the audio frequency generated by the frequency feedback circuit 120.

In some embodiments, the buffering unit correction circuit 130 is configured to reset and regulate the buffering unit 110 to ensure that the water level (WL) value is in an intermediate value of the data capacity range of the buffering unit 110. It should be note that a water level (WL) value refers to a temporary data storage of first-in first-out data. For example, if the data capacity is 128, it means that the buffering unit 110 can store 128 8-bit data. The buffering unit correction circuit 130 is configured to reset a water level (WL) value of the buffering unit 110 to an intermediate value of the data capacity range of the buffering unit 110. In detail, the buffering unit correction circuit 130 resets the data capacity range of the buffering unit 110 to the intermediate value. The intermediate value is 64 units of temporary data storage.

In some embodiments, the clock generator circuit 140 is configured to receive an inputting clock signal f_LS_CLK so as to generate a control signal to the frequency feedback circuit 120.

In some embodiments, once the audio frequency adjustment device 100 receives a piece of audio information, the data processing circuit 150 is configured to process and calculate the audio information to analyze a piece of audio frequency information.

In some embodiments, a data type of the temporary data storage is an audio packet.

Figure 2:
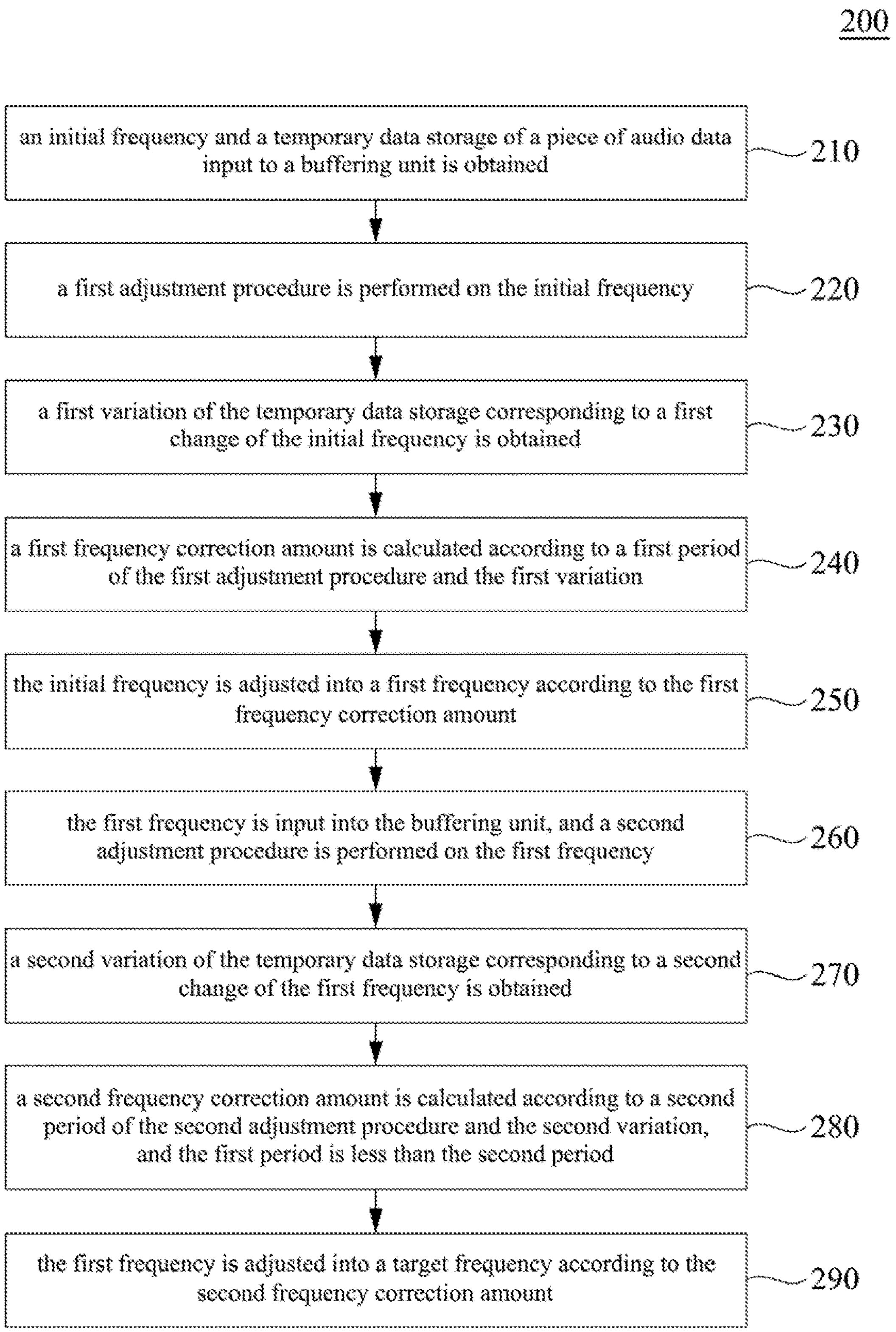
FIG. 2 depicts a flow chart of a method for adjusting audio frequency according to some embodiments of the present disclosure.

FIG. 2 depicts a flow chart of a method for adjusting audio frequency 200 according to some embodiments of the present disclosure. In some embodiments, in order to facilitate the understanding of the method for adjusting audio frequency 200, please refer to FIG. 1 to FIG. 2. In some embodiments, the method for adjusting audio frequency 200 can be executed by the audio frequency adjustment device 100. An example will be provided later for reference.

In step 210, an initial frequency and a temporary data storage of a piece of audio data input to a buffering unit is obtained. In some embodiments, please refer to FIG. 1 to FIG. 2, an initial frequency and a temporary data storage of a piece of audio data input to a buffering unit 110 is obtained by the frequency feedback circuit 120 of the audio frequency adjustment device 100. For example, an actual frequency is 44.205 (kHz). An initial frequency of a piece of audio data analyzed by the audio frequency adjustment device 100 is 43.604 (kHz). A difference between the aforementioned actual frequency and the initial frequency is large. A purpose of the present disclosure is to quickly and accurately adjust the initial frequency of the piece of audio data close to the actual frequency.

In step 220, a first adjustment procedure is performed on the initial frequency. The first adjustment procedure includes following steps 230~250. In step 230, a first variation of the temporary data storage corresponding to a first change of the initial frequency is obtained. In some embodiments, please refer to FIG. 1 to FIG. 2, a first adjustment procedure is performed on the initial frequency by the frequency feedback circuit 120 of the audio frequency adjustment device 100. A first variation of the temporary data storage corresponding to the first change of the initial frequency is obtained by the frequency feedback circuit 120. For example, following the example above, the initial frequency is 43.604 (kHz). The frequency feedback circuit 120 enters the first adjustment procedure with the initial frequency. The frequency feedback circuit 120 obtains the first variation of the temporary data storage of the buffering unit 110. The first variation is that the temporary data storage (i.e., a water level value) of the buffering unit 110 increases to 49 units of the temporary data storage. A first adjustment time length of the first period of the first adjustment procedure is 81 milliseconds (ms).

In step 240, a first frequency correction amount is calculated according to a first period of the first adjustment procedure and the first variation. In some embodiments, a first frequency correction amount is calculated according to a first period of the first adjustment procedure and the first variation by the frequency feedback circuit 120. For example, following the example above, the frequency feedback circuit 120 is configured to divide the first variation by the first adjustment time length of the first period of the first adjustment procedure, that is, dividing 49 units of the temporary data storage by 81 milliseconds (ms) to calculate the first frequency correction amount as 0.599 (kHz).

In some embodiments, the frequency feedback circuit 120 is configured to calculate the frequency correction amount according to a frequency adjustment formula. The frequency adjustment formula is list below:

$$F2 = F1 + \frac{\Delta WL}{\Delta t} \quad \text{formula 1}$$

In formula 1, F2 is an adjusted frequency. F1 is a frequency before adjustment. ΔWL is change of the temporary data storage. Δt is an adjustment time length. The frequency correction amount can be obtained by dividing the change of the temporary data storage by the adjustment time length.

In step 250, the initial frequency is adjusted into a first frequency according to the first frequency correction amount. In some embodiments, please refer to FIG. 1 to FIG. 2, the initial frequency is adjusted into a first frequency according to the first frequency correction amount by the frequency feedback circuit 120. For example, following the example above, the frequency feedback circuit 120 is configured to add the first frequency correction amount to the initial frequency according to the formula 1, that is, 43.604 (kHz) plus 0.599 (kHz), to obtain a first frequency as 44.203 (kHz).

In step 260, the first frequency is input into the buffering unit, and a second adjustment procedure is performed on the first frequency. The second adjustment procedure includes following steps 270~290. The buffering unit 110 receives a piece of audio data according to the first frequency to generate a new temporary data storage. In step 270, a second variation of the temporary data storage corresponding to a second change of the first frequency is obtained.

In some embodiments, the first frequency is input into the buffering unit 110, and a second adjustment procedure is performed on the first frequency by the frequency feedback circuit 120. A second variation of the temporary data storage corresponding to the second change of the first frequency is obtained by the frequency feedback circuit 120. For example, following the example above, assume that the data capacity of the buffering unit 110 is 128 data capacity. The frequency feedback circuit 120 is configured to perform the second adjustment procedure on the first frequency as 44.203 (kHz). The frequency feedback circuit 120 is configured to obtain a second variation of the temporary data storage of the buffering unit 110 corresponding to the second change of the first frequency as 44.203 (kHz). The second variation is that the temporary data storage (i.e., a water level value) of the buffering unit 110 increases to 3 units of the temporary data storage. The second adjustment time length of the second period of the second adjustment procedure is 1000 milliseconds (ms).

In step 280, a second frequency correction amount is calculated according to a second period of the second adjustment procedure and the second variation, and the first period is less than the second period. In some embodiments, please refer to FIG. 1 to FIG. 2, a second frequency correction amount is calculated according to a second period of the second adjustment procedure and the second variation by the frequency feedback circuit 120. For example, following the example above, the frequency feedback circuit 120 is configured to divide the second variation by the second adjustment time length of the second period of the second adjustment procedure, that is, dividing 3 units of the temporary data storage by 1000 milliseconds (ms), to calculate the second frequency correction amount as 0.003 (kHz).

In step 290, the first frequency is adjusted into a target frequency according to the second frequency correction amount. In some embodiments, the first frequency is adjusted into a target frequency according to the second frequency correction amount by the frequency feedback circuit 120. For example, following the example above, the frequency feedback circuit 120 is configured to add the second frequency correction amount to the first frequency according to the formula 1, that is, 44.203 (kHz) plus 0.003 (kHz), to obtain a target frequency as 44.206 (kHz). It should be noted that the target frequency 44.206 (kHz) is very close to the actual frequency 44.205 (kHz), and the error is about one thousandth.

Figure 3A:
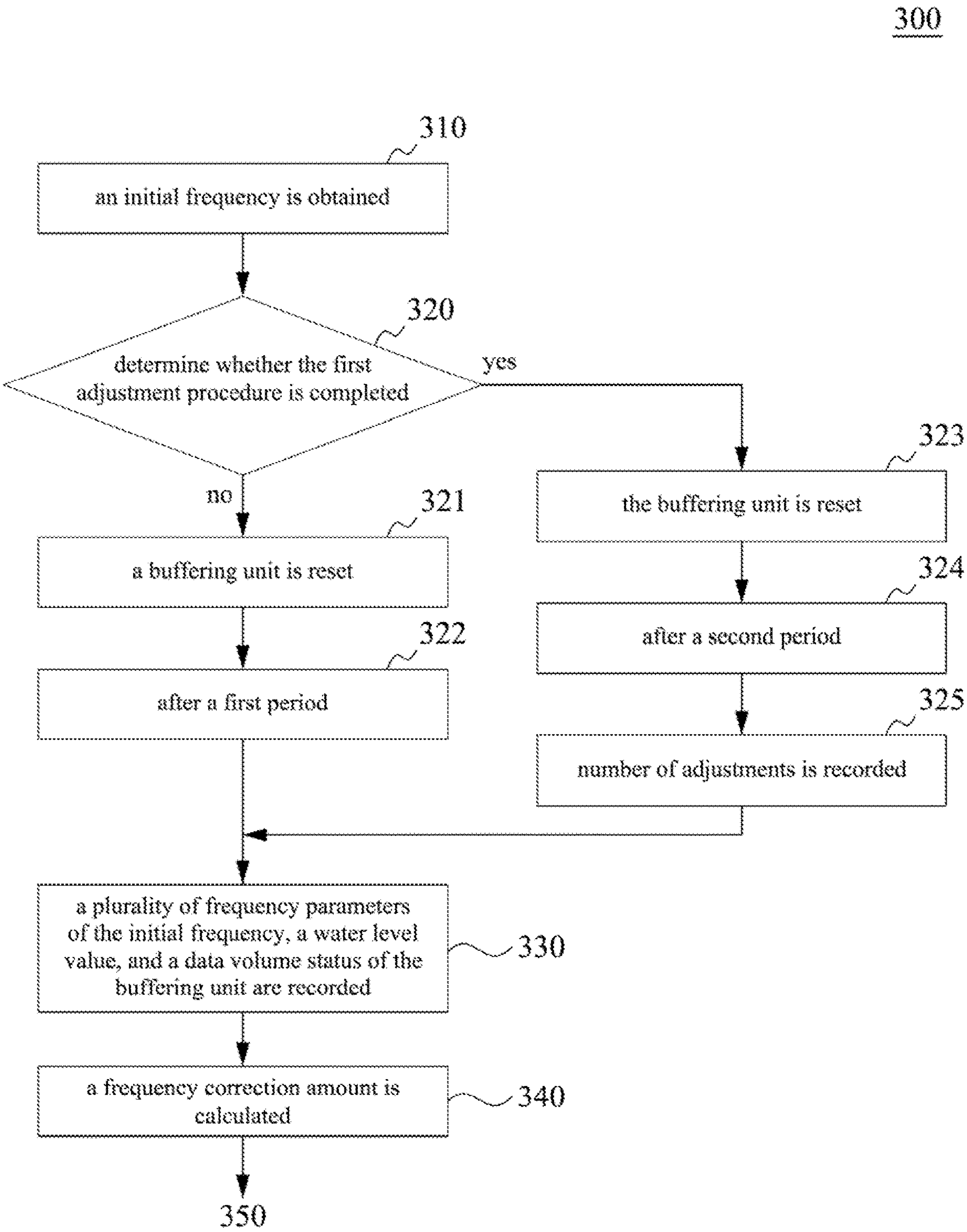
FIG. 3A depicts a part of a flow chart of a method for adjusting an audio frequency according to some embodiments of the present disclosure.
Figure 3B:
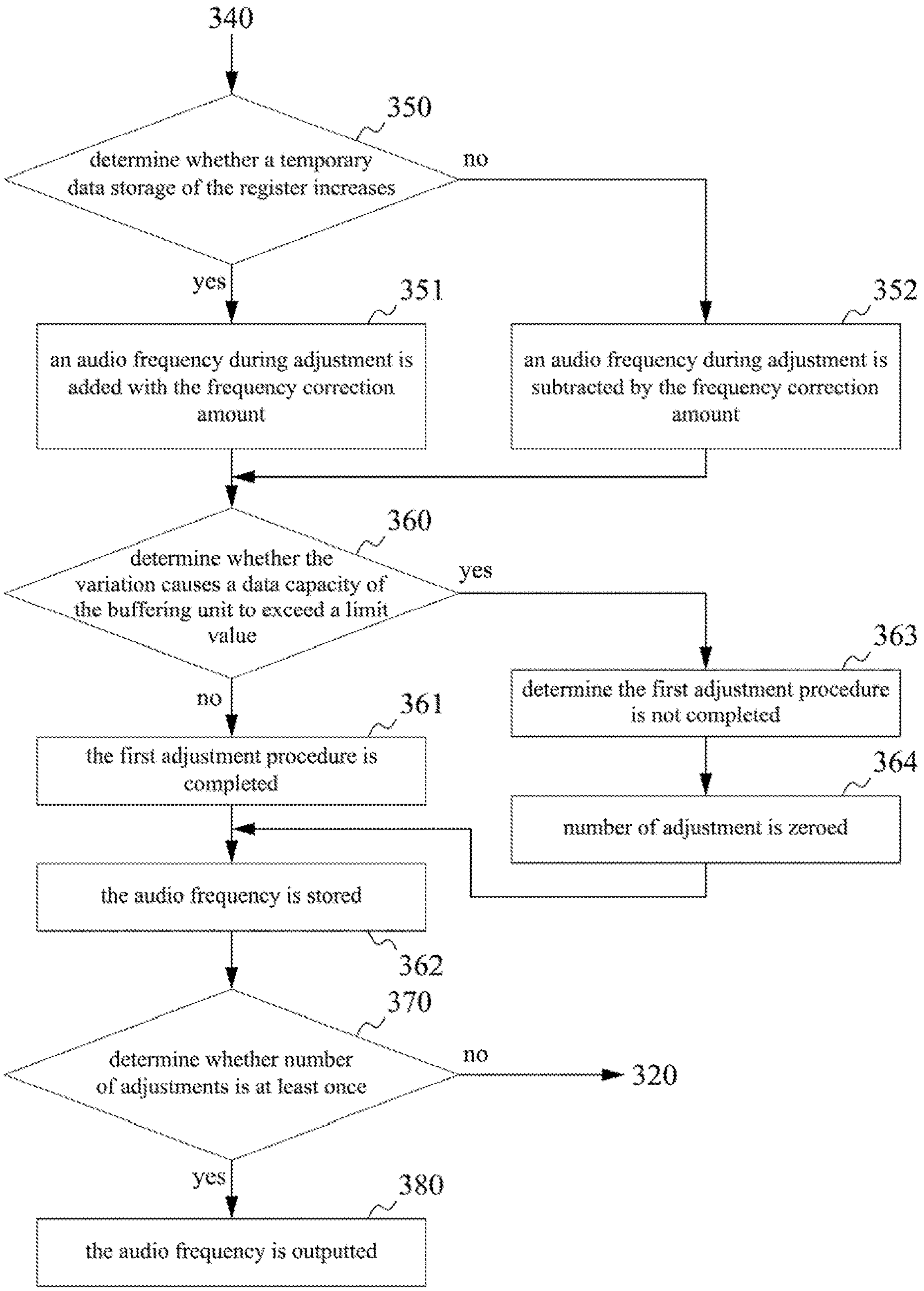
FIG. 3B depicts a part of a flow chart of a method for adjusting an audio frequency according to some embodiments of the present disclosure.

FIG. 3A depicts a part of a flow chart of a method for adjusting an audio frequency 300 according to some embodiments of the present disclosure. FIG. 3B depicts a part of a flow chart of a method for adjusting an audio frequency 300 according to some embodiments of the present disclosure. In some embodiments, the method for adjusting an audio frequency 300 can be executed by the audio frequency adjustment device 100 shown in FIG. 1. In some embodiments, detail steps of the method for adjusting an audio frequency 300 will be described in following paragraphs. An example will be provided later for reference.

In step 310, an initial frequency is obtained. In some embodiments, please refer to FIG. 1 and FIG. 3A, the frequency feedback circuit 120 of the audio frequency adjustment device 100 is configured to obtain an initial frequency and a temporary data storage of a piece of audio data input to a buffering unit 110. For example, an actual frequency is 44.205 (kHz). An initial frequency of a piece of audio data analyzed by the audio frequency adjustment device 100 is 43.564 (kHz).

In step 320, determine whether the first adjustment procedure is completed. In some embodiments, please refer to FIG. 1 and FIG. 3A, the adjustment and judgment circuit 124 of the frequency feedback circuit 120 of the audio frequency adjustment device 100 is configured to determine whether a piece of audio data has undergone the first adjustment procedure. If the piece of audio data has not undergone the first adjustment procedure, the audio frequency adjustment device 100 will be configured to execute steps 321 to 322. If the piece of audio data has undergone the first adjustment procedure, the audio frequency adjustment device 100 will be configured to execute steps 323 to 325. The adjustment and judgment circuit 124 is configured to determine according to an adjustment data in the piece of audio data. The adjustment data includes records of step 361 or step 363.

In step 321, a buffering unit is reset. In some embodiments, please refer to FIG. 1 and FIG. 3A, the buffering unit correction circuit 130 of the audio frequency adjustment device 100 is configured to reset the data capacity of the buffering unit 110 to an intermediate value. For example, If the data capacity is 64, it means that the buffering unit 110 can store 64 8-bit date. The buffering unit correction circuit 130 is configured to reset a water level (WL) value of the buffering unit 110 to an intermediate value of the data capacity range of the buffering unit 110. The intermediate value is 32 units of temporary data storage.

In step 322, after a first period. In some embodiments, the frequency feedback circuit 120 of the audio frequency adjustment device 100 is configured to obtain a first variation of the temporary data storage corresponding to the first change of the initial frequency after a first period of the first adjustment procedure. For example, following the example above, an initial frequency is 43.564 (kHz). If the initial frequency has not undergone two adjustment procedures, the initial frequency enters the first adjustment procedure. After the first period of the first adjustment procedure, the frequency feedback circuit 120 is configured to obtain the first variation of the temporary data storage of the buffering unit 110. The first variation is that the temporary data storage (i.e., water level value) of the buffering unit 110 raise to 48 units of the temporary data storage. A first adjustment time length of the first period of the first adjustment procedure is 84 milliseconds (ms).

In step 330, a plurality of frequency parameters of the initial frequency, a water level value, and a data volume status of the buffering unit are recorded. In some embodiments, the audio frequency adjustment device 100 is configured to record a plurality of frequency parameters of the initial frequency, a water level value, and a data volume status of the buffering unit 110. In detail, the audio frequency adjustment device 100 is configured to record frequencies before and after an adjustment, temporary data storages of the buffering unit 110 before and after an adjustment, and adjustment time lengths after the two adjustment procedures.

In step 340, a frequency correction amount is calculated. In some embodiments, please refer to FIG. 1 and FIG. 3A, the computing circuit 123 of the audio frequency adjustment device 100 is configured to calculate a frequency correction amount according to the variation of the temporary data storage of the buffering unit 110. For example, following the example above, the computing circuit 123 is configured to divide the variation by the first adjustment time length of the first period of the first adjustment procedure according to the formula 1, that is, dividing 48 units of temporary data storage by the 84 milliseconds (ms), to obtain a frequency correction amount as 0.5714 (kHz).

In step 350, determine whether a temporary data storage of the buffering unit increases. In some embodiments, please refer to FIG. 1 and FIG. 3A, the water level value judgment circuit 122 of the audio frequency adjustment device 100 is configured to determine whether a temporary data storage of the buffering unit 110 increases. If the temporary data storage increases, the audio frequency adjustment device 100 will be configured to execute step 351. If the temporary data storage decreases, the audio frequency adjustment device 100 will be configured to execute step 352.

In step 351, an audio frequency during adjustment is added with the frequency correction amount.

In step 352, an audio frequency during adjustment is subtracted by the frequency correction amount.

In some embodiments, no matter the temporary data storage of the buffering unit 110 increases or decreases, the computing circuit 123 of the audio frequency adjustment device 100 is configured to adjust the audio frequency according to the above formula 1. For example, following the example above, the computing circuit 123 is configured to add the frequency correction amount to an frequency during adjustment, that is, 43.564 (kHz) plus 0.5714 (kHz), to obtain an adjusted frequency as 44.135 (kHz).

In step 360, determine whether the variation causes a data capacity of the buffering unit to exceed a limit value, that is, determine whether a water level (WL) value in the buffering unit exceeds a preset range. In some embodiments, please refer to FIG. 1 and FIG. 3A, the water level value judgment circuit 122 of the audio frequency adjustment device 100 is configured to determine whether the variation causes the data capacity of the buffering unit 110 to exceed a limit value. If the variation causes the data capacity of the buffering unit 110 to exceed a limit value, the audio frequency adjustment device 100 will be configured to execute the step 363. If the variation does not cause the data capacity of the buffering unit 110 to exceed a limit value, the audio frequency adjustment device 100 will be configured to execute the step 361. For example, following the example above, the adjusted frequency 44.135 (kHz) goes through the first adjustment procedure, the variation does not cause the data capacity of the buffering unit 110 to exceed a limit value, the audio frequency adjustment device 100 will be configured to execute the step 361.

In step 361, the first adjustment procedure is completed.

In step 362, the audio frequency is stored. In some embodiments, the audio frequency adjustment device 100 is configured to store audio frequencies adjusted by each of adjustment procedures so as to ensure that a readjusted frequency will not cause the buffering unit 110 to exceed a limit value of the data capacity.

Back to the step 323, in step 323, the buffering unit is reset. Details of this step have been described in step 321, and repetitious details are omitted herein.

In step 324, after a second period. In some embodiments, please refer to FIG. 1 to FIG. 3A, when the water level value judgment circuit 122 determines that the variation does not cause the data capacity of the buffering unit 110 to exceed a limit value, the piece of audio data will be available for the second adjustment procedure. In detail, when the piece of audio data enters the second adjustment procedure, step 324 is similar to steps 260~270 of the method for adjusting audio frequency 200, and repetitious details are omitted herein.

For example, following the example above, the frequency after the first adjustment procedure is 44.135 (kHz), and enters the second adjustment procedure. The variation is 63 units of temporary data storage. A second adjustment time length of the second period of the second adjustment procedure is 1075 milliseconds (ms). Therefore, a frequency correction amount is 0.0586 (kHz). A final frequency is 44.192 (kHz).

In step 325, number of adjustments is recorded. In some embodiments, please refer to FIG. 1 to FIG. 3A, when the audio frequency finishes the second adjustment procedure, the audio frequency adjustment device 100 is configured to record number of adjustments in the piece of audio data.

In step 360, determine whether the variation causes the data capacity of the buffering unit to exceed a limit value. For example, following the example above, the adjusted frequency of 44.192 (KHz) has undergone the second adjustment procedure, but the variation causes the data capacity of the buffering unit 110 to exceed the limit value, the audio frequency adjustment device 100 will be configured to execute step 363.

In step 363, determine the first adjustment procedure is not completed. In some embodiments, the water level value judgment circuit 122 is configured to determine that the variation causes the data capacity of the buffering unit 110 to exceeds the limit value. Therefore, a status of the piece of audio data is set as the first adjustment procedure is not completed. The piece of audio data needs to execute the first adjustment procedure. The piece of audio data will be executed steps 364, 362, 370, 320, 321, 322, 330, 340, 350 to 360 in sequence.

In step 364, number of adjustments is zeroed. In some embodiments, please refer to FIG. 1 and FIG. 3A, if the status of the piece of audio data is that the first adjustment procedure is not completed, the frequency feedback circuit 120 is configured to zero number of adjustments. It should be note that adjustment times are related to the second adjustment procedure.

It is further explained that a reason why the first adjustment procedure is not completed is that a limit value of the data capacity of the buffering unit 110 is exceeded, which means that a modification of the piece of audio data is relatively large. After the audio frequency is adjusted each time, step 362 is executed by the audio frequency adjustment device 100 to ensure that the readjusted frequency will not cause the data capacity of the buffering unit 110 to exceed the limit value.

In step 320, determine whether the first adjustment procedure is completed. For example, following the example above, the adjusted frequency is 44.192 (kHz). Since the variation cause the data capacity of the buffering unit 110 to exceed the limit value, a setting of the first adjustment procedure is not completed in step 363 so that the adjusted frequency is 44.192 (kHz) and the first adjustment procedure is performed again. This time, the first adjustment time length of the first period of the first adjustment procedure has passed 89 milliseconds (ms). The variation of the buffering unit 110 is 1 unit of temporary data storage. The computing circuit 123 is configured to calculate the frequency correction amount of 0.0112 (kHz) according to the formula 1. The frequency after two times of the first adjustment procedure is 44.203 (kHz), and a relative variation of the frequency after twice times of the first adjustment procedure does not cause the data capacity of the buffering unit 110 to exceed a limit value. Therefore, the piece of audio data will be executed steps 361, 362, 320, 323 to 325, 330 to 370. Enter the second adjustment procedure again, and repetitious details are omitted herein.

For example, following the example above, after two times of the first adjustment procedure, the frequency is 44.203 (KHz) to enter the second adjustment procedure. The variation is 2 units of temporary. A second adjustment time length of the second period of the second adjustment procedure is 1049 milliseconds (ms). Therefore, frequency correction amount is 0.001 (kHz). A final frequency is 44.204 (kHz).

In step 370, determine whether number of adjustments is at least once. In some embodiments, the audio frequency adjustment device 100 is configured to determine whether number of adjustments is at least once. If number of adjustments of the piece of audio data is at least once, output the audio frequency. If number of adjustments of the piece of audio data is not at least once, repeat the above step 320 to step 370 until the target frequency is obtained.

In step 380, the audio frequency is outputted.

It should be noted that the above step 321 and step 322 are corresponding to the first adjustment procedure. The above step 323 and step 325 are corresponding to the second adjustment procedure. A difference between the first adjustment procedure and the second adjustment procedure is that adjustment time lengths of the piece of audio data are different and amplitudes of the audio frequency are different.

In some embodiments, the above step 320 to step 370 can be repeated.

Based on the above embodiments, the present disclosure provides a method for adjusting audio frequency and an audio frequency adjustment device to quickly and accurately adjust an initial frequency of a piece of audio data close to an actual frequency.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A method for adjusting an audio frequency, comprising:

obtaining, by a frequency feedback circuit, an initial frequency and a temporary data storage of a piece of audio data input to a buffer;

performing, by the frequency feedback circuit, a first adjustment procedure on the initial frequency, wherein the first adjustment procedure comprises:

obtaining a first variation of the temporary data storage corresponding to a first change of the initial frequency, wherein the first variation indicates a change of a water level value of the buffer;

calculating a first frequency correction amount according to a first period of the first adjustment procedure and the first variation; and adjusting the initial frequency into a first frequency according to the first frequency correction amount;

inputting, by the frequency feedback circuit, the first frequency into the buffer; and performing, by the frequency feedback circuit, a second adjustment procedure on the first frequency, wherein the second adjustment procedure comprises:

obtaining a second variation of the temporary data storage corresponding to a second change of the first frequency, wherein the second variation indicates a further change of the water level value of the buffer;

calculating a second frequency correction amount according to a second period of the second adjustment procedure and the second variation, wherein the first period of the first adjustment procedure is less than the second period of the second adjustment procedure; and adjusting the first frequency into a target frequency according to the second frequency correction amount, wherein obtaining the second variation of the temporary data storage corresponding to the second change of the first frequency comprises:

calculating the second frequency correction amount according to the second period of the second adjustment procedure and the second variation if the second variation causes a data capacity of the buffer to exceed a limit value;

adjusting the first frequency into a second frequency according to the second frequency correction amount;

inputting the second frequency into the buffer;

performing the first adjustment procedure on the second frequency to obtain a third variation of the temporary data storage corresponding to a third change of the second frequency;

calculating a third frequency correction amount according to the first period of the first adjustment procedure and the third variation; and adjusting the second frequency into a third frequency according to the third frequency correction amount.

2. The method for adjusting the audio frequency of claim 1, wherein obtaining the initial frequency and the temporary data storage of the piece of audio data input to the buffer comprises:

recording a plurality of frequency parameters of the initial frequency, the water level value, and a data volume status of the buffer.

3. The method for adjusting the audio frequency of claim 1, wherein calculating the first frequency correction amount according to the first period of the first adjustment procedure and the first variation comprises:

calculating the first frequency correction amount according to a first adjustment time of the first period of the first adjustment procedure and the first variation.

4. The method for adjusting the audio frequency of claim 3, wherein calculating the second frequency correction amount according to the second period of the second adjustment procedure and the second variation comprises:

calculating the second frequency correction amount according to a second adjustment time of the second period of the second adjustment procedure and the second variation, wherein the first frequency correction amount is different from the second frequency correction amount.

5. The method for adjusting the audio frequency of claim 1, wherein obtaining the second variation of the temporary data storage corresponding to the second change of the first frequency further comprises:

inputting the third frequency into the buffer;

performing the second adjustment procedure on the third frequency to obtain a fourth variation of the temporary data storage corresponding to a fourth change of the third frequency;

determining whether the fourth variation causes the data capacity of the buffer to exceed the limit value; and calculating a fourth frequency correction amount according to the second period of the second adjustment procedure and the fourth variation if the fourth variation does not causes the data capacity of the buffer to exceed the limit value.

6. The method for adjusting the audio frequency of claim 5, wherein obtaining the second variation of the temporary data storage corresponding to the second change of the first frequency further comprises:

adjusting the third frequency into the target frequency according to the fourth frequency correction amount.

7. The method for adjusting the audio frequency of claim 1, further comprising:

resetting the data capacity of the buffer to an intermediate value.

8. The method for adjusting the audio frequency of claim 1, wherein a data type of the temporary data storage is an audio packet.

9. An audio frequency adjustment device, comprising:

a buffer, configured to receive a piece of audio data; and a frequency feedback circuit, coupled to the buffer, wherein the frequency feedback circuit is configured to obtain an initial frequency and a temporary data storage of a piece of audio data input to the buffer, the frequency feedback circuit is configured to perform a first adjustment procedure on the initial frequency, wherein the first adjustment procedure comprises:

obtaining a first variation of the temporary data storage corresponding to a first change of the initial frequency, wherein the first variation indicates a change of a water level value of the buffer;

calculating a first frequency correction amount according to a first period of the first adjustment procedure and the first variation; and adjusting the initial frequency into a first frequency according to the first frequency correction amount;

wherein the frequency feedback circuit is configured to input the first frequency to the buffer, the frequency feedback circuit is configured to perform a second adjustment procedure on the first frequency, wherein the second adjustment procedure comprises:

obtaining a second variation of the temporary data storage corresponding to a second change of the first frequency, wherein the second variation indicates a further change of the water level value of the buffer;

calculating a second frequency correction amount according to a second period of the second adjustment procedure and the second variation, wherein the first period of the first adjustment procedure is less than the second period of the second adjustment procedure; and adjusting the first frequency into a target frequency according to the second frequency correction amount, wherein if the second variation causes a data capacity of the buffer to exceed a limit value, the frequency feedback circuit is configured to calculate the second frequency correction amount according to the second period of the second adjustment procedure and the second variation to adjust the first frequency into a second frequency according to the second frequency correction amount so as to input the second frequency into the buffer, wherein the frequency feedback circuit is further configured to perform the first adjustment procedure on the second frequency to obtain a third variation of the temporary data storage corresponding to a third change of the second frequency, wherein the frequency feedback circuit is further configured to calculate a third frequency correction amount according to the first period of the first adjustment procedure and the third variation, and adjust the second frequency into a third frequency according to the third frequency correction amount.

10. The audio frequency adjustment device of claim 9, wherein the frequency feedback circuit comprises:

a water level value judgment circuit, configured to record a plurality of frequency parameters of the initial frequency, the water level value, and a data volume status of the buffer.

11. The audio frequency adjustment device of claim 10, wherein the frequency feedback circuit further comprises:

a computing circuit, coupled to the water level value judgment circuit, and configured to calculate the first frequency correction amount according to a first adjustment time of the first period of the first adjustment procedure and the first variation.

12. The audio frequency adjustment device of claim 11, wherein the computing circuit is further configured to calculate the second frequency correction amount according to a second adjustment time of the second period of the second adjustment procedure and the second variation, wherein the first frequency correction amount is different from the second frequency correction amount.

13. The audio frequency adjustment device of claim 9, wherein the frequency feedback circuit is further configured to input the third frequency to the buffer, and perform the second adjustment procedure on the third frequency to obtain a fourth variation of the temporary data storage corresponding to a fourth change of the third frequency, wherein the frequency feedback circuit is further configured to determine whether the fourth variation causes the data capacity of the buffer to exceed the limit value, wherein if the fourth variation does not causes the data capacity of the buffer to exceed the limit value, the frequency feedback circuit is further configured to calculate a fourth frequency correction amount according to the second period of the second adjustment procedure and the fourth variation.

14. The audio frequency adjustment device of claim 13, wherein the frequency feedback circuit is further configured to adjust the third frequency into the target frequency according to the fourth frequency correction amount.

15. The audio frequency adjustment device of claim 9, further comprising:

a buffer correction circuit, configured to reset the data capacity of the buffer to an intermediate value.

16. The audio frequency adjustment device of claim 9, wherein a data type of the temporary data storage is an audio packet.

* * * * *